Sept. 28, 1948.    M. WARE    2,450,214
DUAL DRIVE MECHANISM
Filed March 27, 1944
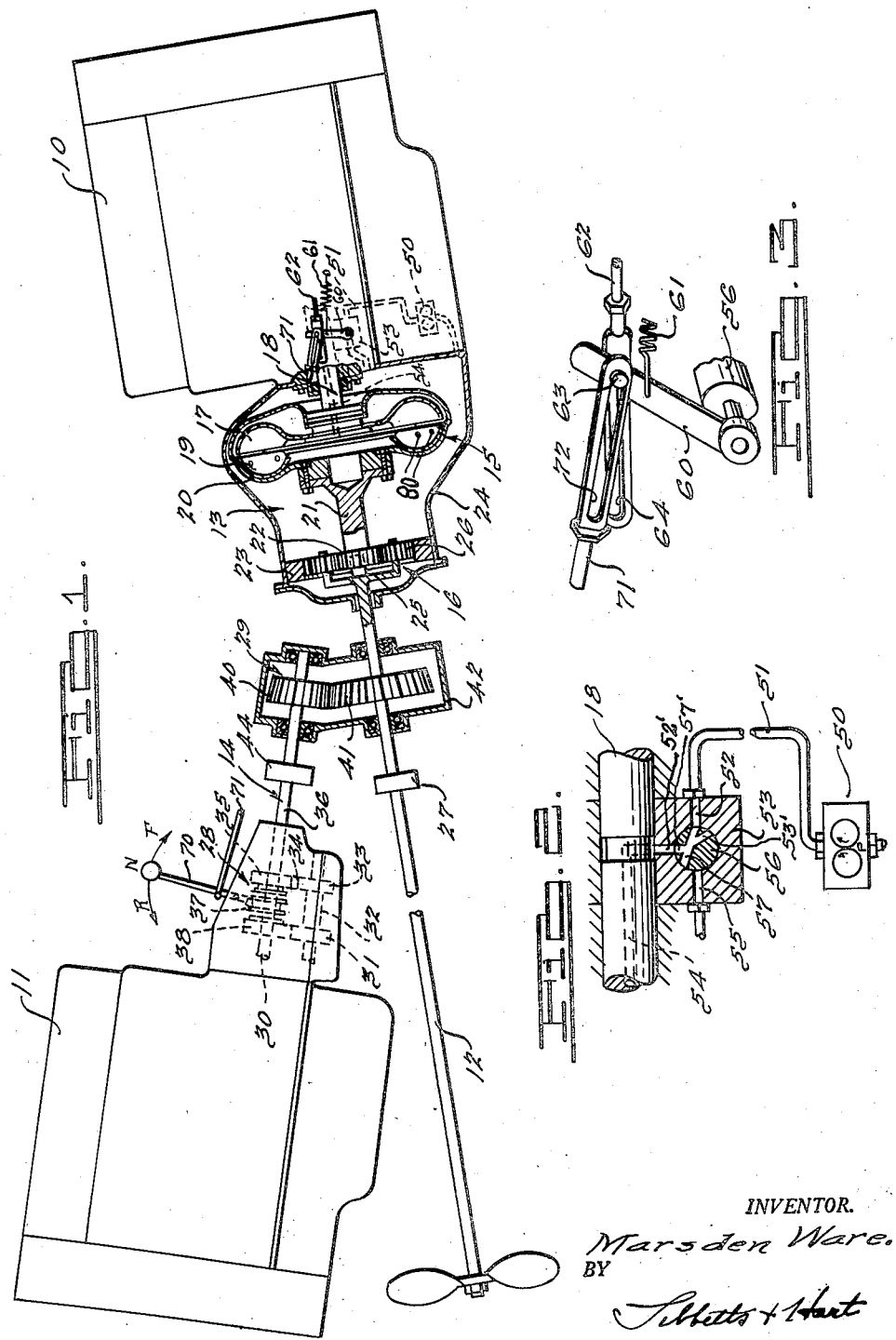
INVENTOR.
Marsden Ware.
BY
ATTORNEYS.

Patented Sept. 28, 1948

2,450,214

UNITED STATES PATENT OFFICE 2,450,214

DUAL DRIVE MECHANISM

Marsden Ware, Huntington Woods, Mich., assignor to Packard Motor Car Company, Detroit, Mich., a corporation of Michigan Application March 27, 1944, Serial No. 528,211

5 Claims. (Cl. 74—389)

This invention relates to drive mechanism and more particularly to drive mechanism employing a plurality of prime movers for rotating the same shaft.

One of the objects of the invention is to prevent synchronous build-up of vibration between two drive shafts connected to drive the same shaft.

Another object of the invention is to provide a two-engine drive for a shaft with individual transmissions intercontrolled to render one of the transmissions ineffective when the other drive is operating to transmit reverse rotation.

Another object of the invention is to provide two engines with individual transmissions for driving the same shaft, one of the transmissions including a fluid clutch that can be supplied with or drained of fluid at will.

A further object of the invention is to provide means for synchronizing the power delivery of two engines to a shaft.

Another object of the invention is to provide a dual drive means in which one drive means is rendered ineffective while the other drive means is operating in reverse.

Other objects of the invention will appear from the following description taken in connection with the drawings, which form a part of this specification, and in which:

Fig. 1 is an elevational view, partly schematic and partly in section, showing drive mechanism illustrating the invention;

Fig. 2 is a fragmentary sectional and diagrammatic view illustrating the fluid flow circuit for the fluid clutch;

Fig. 3 is an enlarged fragmentary elevational view of the control for the fluid valve.

The drive mechanism shown in the drawings has two prime movers 10 and 11, that can be similar internal combustion engines, for rotating a driven shaft 12, such as a sectional propeller shaft for boats. The engines are connected in driving relation with the driven shaft by individual transmission mechanisms 13 and 14.

The transmission mechanism between engine 10 and the driven shaft includes a conventional fluid clutch 15 and planetary reduction gearing 16. The impeller 17 of the clutch is fixed to crankshaft 18 of engine 10 and runner 19 is secured to housing 20 that is fixed to shaft 21. The planetary reduction gearing has a sun gear 22 fixed to shaft 21 and a ring gear 23 fixed to the casing 24. Carrier 25 provides a mounting for planet pinions 26 and is fixed on a section of the driven shaft 12. The driven shaft sections are connected by a flexible coupling 27.

The transmission mechanism between engine 11 and the driven shaft includes conventional forward and reverse gearing 28 and reduction gearing 29. Crankshaft 30 of engine 11 has gear 38 fixed thereto and such gear meshes with gear 31 on sleeve 32. Gear 33 on sleeve 32 meshes with reverse drive pinion 34 which in turn meshes with gear 35 rotatably mounted on tail shaft 36. A clutch 37 is slidably splined on shaft 26 and can be shifted to selectively engage clutch faces on gears 38 and 35. When clutch 37 engages gear 38 the drive will be forward and directly to shaft 36, and when the clutch engages gear 35 the drive will be reverse through gears 38, 31, 33, pinion 34 and gear 35.

The reduction gearing 29 consists of gears 40 and 41 enclosed in housing 42. Gear 41 is fixed on the driven shaft between coupling 27 and carrier 25 and meshes with gear 40 fixed on shaft 36. Shaft 36 has a flexible coupling 44 therein for alignment purposes. The drive reduction through gearing 29 is substantially the same as that through planetary gearing 16 and the engines are synchronized to run at substantially the same speed and provide substantially the same power through conventional interconnected throttle control mechanism (not shown). When there is a difference in the driving speed of the engines, such difference can be compensated for by slippage in the fluid clutch. The fluid clutch will also serve to prevent synchronous build-up of vibration between the engines.

Provision is made to render the fluid clutch ineffective at will and to automatically render the clutch ineffective whenever the gearing 28 is in reverse drive position. One way to regulate the drive from the fluid clutch is to control fluid flow to the clutch. An engine operated pump 50 is connected by conduit 51 with passages 52 and 52' in crankshaft bearing 53 and passage 52' communicates with an axially extending passage 54 in the end of the crankshaft 18 that opens to the interior of the fluid clutch. A drain passage or by-pass 55 is also formed in bearing 53 and flow through such passages is controlled by a valve 56. Passage 57 in the valve has branch passages 53' and 57'. In one position of the valve, passages 57 and 57' connect passages 52 and 52' so that fluid will flow to the fluid clutch and passage 55 will be shut off. In another position of the valve passages 53' and 57 will connect passages 52 and 55 and as passage 52' is closed fluid will flow into casing 24 and will by-pass the fluid clutch. When the valve is adjusted so that fluid by-passes the clutch, fluid in the clutch will drain into casing 24 through openings 80, and thus the drive connection between engine 10 and shaft 21 will be broken. Fluid will flow through openings 80 when the fluid circuit is open to the clutch but the fluid drainage is sufficiently restricted by the size of the openings to maintain an adequate supply of fluid in the clutch.

The valve can be turned to clutch filling or by-passing position by an arm 60 fixed thereto. The arm is normally shifted by a suitably anchored coil spring 61 to position the valve so that fluid flows into clutch 17. The valve is moved to drain position by axially shiftable rod 62 operable manually or by suitable power means. Pin 63 is fixed to and projects from opposite sides of arm 60 and rod 62 has a slot 64 therein in which the pin rides. When rod 62 is moved to the left, as viewed in Figs. 1 and 3, the pin will be at the right end of slot 64 and the arm 60 will be carried to the left, turning valve 56 to a position diverting fluid from flowing to the clutch. Upon releasing rod 62, when in fluid diverting position, spring 61 will move the rod and valve back to position closing the drain passage and opening the fluid feed passages to the fluid clutch.

Clutch member 37 is shifted by lever 70 and provision is made to have the fluid clutch automatically drained when gearing 28 is conditioned for reverse drive. To this end a link 71 is pivotally connected to shift lever 70 and to arm 60. Pin 63 on the arm rides in a slot 72 in link 71 and is seated at the right end of the slot, as viewed in Fig. 3, when the lever is in neutral or forward drive positions. Movement of lever 70 to the left, as viewed in Fig. 1, will shift clutch 37 to engage gear 35 for reverse drive and will carry the link 71 and arm 60 to the left, turning the valve 56 into drain position. Thus, when engine 11 is rotating the propeller shaft for reverse drive, fluid will by-pass the fluid clutch and fluid in the clutch 17 will drain out through openings 80. Thus the driving connection between engine 10 and shaft 21 will be entirely broken.

It will be noted that the propeller shaft can be rotated for forward drive by both engines and any difference in applied power will be compensated for by slippage in the fluid clutch. The fluid clutch will also act to prevent synchronous build-up of vibration between the engines. The power connection between engine 10 and the propeller shaft can be disconnected at will through operation of rod 62 or it can be disconnected automatically by operation of the control lever for the drive from engine 11 when the transmission mechanism 14 is conditioned for reverse drive.

Although the invention has been described in connection with a specific embodiment, the principles involved are susceptible of numerous other applications which will readily occur to persons skilled in the art.

What is claimed is:

1. In drive mechanism, a driven shaft, a pair of drive shafts, a transmission mechanism for connecting one of the drive shafts to selectively rotate the driven shaft in forward or reverse drive, another transmission mechanism for connecting the other drive shaft to rotate the driven shaft including a fluid clutch, shift means operable to select the drive through the first mentioned transmission mechanism, means for feeding fluid to the clutch, and means controlled by said shift means to effect diversion of fluid from the clutch when the first mentioned transmission mechanism is conditioned for reverse drive.

2. In drive mechanism, a driven shaft, a pair of drive shafts, a transmission mechanism for connecting one drive shaft to selectively rotate the driven shaft forwardly or reversely, another transmission mechanism including a clutch for connecting the other drive shaft in driving relation with the driven shaft, a selector means for controlling the drives through the first mentioned transmission mechanism, and means connected to be actuated by the selector means when in position conditioning the first mentioned transmission mechanism for reverse drive for rendering said clutch ineffective to drive said driven shaft.

3. In a drive mechanism, a driven shaft, a pair of drive shafts, a transmission mechanism for connecting one of the drive shafts in driving relation with the driven shaft, said transmission mechanism having forward and reverse drive gearing, selector means operable to establish either of the drives through the transmission mechanism, another transmission mechanism for connecting the other drive shaft in driving relation with the driven shaft and including a fluid clutch, means for circulating fluid through the clutch, valve means for diverting fluid flowing to the clutch, and means connected with the selector means for controlling said valve means.

4. In a drive mechanism, a driven shaft, a pair of drive shafts, a forward and reverse drive transmission mechanism for connecting one of the drive shafts with the driven shaft, another transmission mechanism including a fluid clutch for separately connecting the other driven shaft in driving relation with the driven shaft, a shift lever for selecting forward or reverse drive through the first mentioned transmission mechanism, means for supplying fluid to said clutch, valve means for diverting fluid flowing to the clutch, lost motion means connecting the shift lever with the valve means to divert the fluid from flowing to the clutch when the shift lever is moved to condition the first mentioned transmission for reverse drive, and means for operating the valve means independently of the lost motion means.

5. In a drive mechanism, a driven shaft, a pair of drive shafts, a first transmission mechanism for connecting one drive shaft to selectively rotate the driven shaft forwardly or reversely, a second transmission mechanism for connecting the other drive shaft in driving relation with the driven shaft and including a disconnecting means, selector means for controlling the drives through the first transmission mechanism, and means actuated by the selector means when the first transmission mechanism is moved to reverse drive position for operating said disconnecting means to disconnect the second transmission mechanism from driving relation with its respective drive shaft.

MARSDEN WARE.

REFERENCES CITED

The following references are of record in the file of this patent:

UNITED STATES PATENTS

| Number | Name | Date |
|---|---|---|
| 1,540,610 | Desmoulins | June 2, 1925 |
| 1,564,516 | Breguet | Dec. 8, 1925 |
| 1,710,962 | Banner | Apr. 30, 1929 |
| 1,953,486 | Kiep | Apr. 3, 1934 |
| 2,229,153 | Ware | Jan. 21, 1941 |
| 2,305,373 | Adamson | Dec. 15, 1942 |
| 2,309,559 | Wemp | Jan. 26, 1943 |

FOREIGN PATENTS

| Number | Country | Date |
|---|---|---|
| 464,775 | Great Britain | Apr. 23, 1938 |

Certificate of Correction

Patent No. 2,450,214.  September 28, 1948.

MARSDEN WARE

It is hereby certified that error appears in the printed specification of the above numbered patent requiring correction as follows:

Column 4, line 30, claim 4, for the word "driven" read *drive*;

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.*